(12) United States Patent
Kim et al.

(10) Patent No.: US 7,512,058 B2
(45) Date of Patent: Mar. 31, 2009

(54) RECORDING MEDIUM, METHOD OF CONFIGURING CONTROL INFORMATION THEREOF, RECORDING AND/OR REPRODUCING METHOD USING THE SAME, AND APPARATUS THEREOF

(75) Inventors: Jin Yong Kim, Seongnam-si (KR); Sang Woon Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 1010 days.

(21) Appl. No.: 10/883,844

(22) Filed: Jul. 6, 2004

(65) Prior Publication Data

US 2005/0018566 A1  Jan. 27, 2005

(30) Foreign Application Priority Data

Jul. 7, 2003 (KR) ............... 10-2003-0045826
Jul. 8, 2003 (KR) ............... 10-2003-0046147

(51) Int. Cl.
*G11B 7/00* (2006.01)
(52) U.S. Cl. ............... 369/124.07; 369/53.2; 369/275.3
(58) Field of Classification Search .......... None
See application file for complete search history.

(56) References Cited

U.S. PATENT DOCUMENTS

| 5,448,536 A | 9/1995 | Muranishi et al. |
| 2002/0048646 A1 | 4/2002 | Tomura et al. |
| 2008/0056092 A1* | 3/2008 | Kim et al. ............... 369/59.25 |

FOREIGN PATENT DOCUMENTS

EP  1172810  1/2002

OTHER PUBLICATIONS

PCT International Search Report, dated Sep. 16, 2004.

* cited by examiner

*Primary Examiner*—Paul Huber
(74) *Attorney, Agent, or Firm*—Harness, Dickey & Pierce

(57) ABSTRACT

The present invention provides a method of configuring and recording control information on an optical disc, thereby enabling to facilitate to utilize the specified control information and to efficiently cope with the recording/reproducing of the optical discs. In configuring a control information within a disc management area of a read-only or recordable disc, the present invention includes configuring the control information with a common field recording an information commonly applied to both of the read-only and recordable discs and a specific field recording an information failing to be commonly applied to at least one disc type.

15 Claims, 11 Drawing Sheets

FIG. 5

BD-ROM DI

| Byte position | Content | No. of bytes |
| --- | --- | --- |
| 0 | Disc Information identifier="DI" | 2 |
| 2 | DI format | 1 |
| 3 | Reserved = 00h | 1 |
| 4 | Number of DI Units in each DI Block | 1 |
| 5 | DI Frame sequence number in DI Block(="00h") | 1 |
| 6 | Number of DI bytes in use in this DI Unit | 1 |
| 7 | Reserved = 00h | 1 |
| 8 to 10 | disc type identifier = "BDO" | 3 |
| 11 | disc size / version | 1 |
| 12 | disc structure | 1 |
| 13 | channel bit length | 1 |
| 14 to 15 | Reserved = all 00h | 2 |
| 16 | BCA descriptor | 1 |
| 17 | maximum transfer rate of application | 1 |
| 18 to 23 | Reserved = all 00h | 6 |
| 24 to 31 | Data Zone allocation | 8 |
| 32 to 111 | reserved - all 00h | 80 |
| 112 | Disc Information identifier="DI" | 112 |
| 117 | DI Frame sequence number in DI Block(="01h") | |
| 144 to 223 | Reserved - all 00h | |
| 224 to 335 | Disc Information Unit 2 | 112 |
|  | Disc Information Unit i | 112 |
| 1904 to 2015 | Disc Information Unit 17 | 112 |
| 2016 to 2047 | all 00h | 32 |

| Byte position | Content | No of bytes |
|---|---|---|
| 0 | Disc Information identifier="DI" | 2 |
| 2 | DI format | 1 |
| 3 | Reserved = 00h | 1 |
| 4 | Number of DI Frame in each DI Block | 1 |
| 5 | DI Frame sequence number in DI Block(="00h") | 1 |
| 6 | Number of DI bytes in use in this DI Frame | 1 |
| 7 | Reserved = 00h | 1 |
| 8 to 10 | disc type identifier = "BDW" | 3 |
| 11 | disc size / version | 1 |
| 12 | disc structure | 1 |
| 13 | channel bit length | 1 |
| 14 to 15 | DI Frame pointer for velocity | 2 |
| 16 | BCA descriptor | 1 |
| 17 | maximum transfer rate of application | 1 |
| 18 to 23 | Reserved = all 00h | 6 |
| 24 to 31 | Data Zone allocation | 8 |
| 32 to 111 | Write strategy parameters | 80 |
| 112 | Disc Information identifier="DI" | 112 |
| 117 | DI Frame sequence number in DI Block(="01h") | |
| 144 to 223 | Write strategy parameters | |
| 224 to 335 | Disc Information Frame (="02h") | 112 |
|  | Disc Information Frame (="ih") | 112 |
| 1904 to 2015 | Disc Information Frame (="17h") | 112 |

| Byte position | Content | No. of bytes |
|---|---|---|
| 0 | Disc Information identifier="DI" | 2 |
| 2 | DI format | 1 |
| 3 | Reserved = 00h | 1 |
| 4 | Number of DI Frame in each DI Block | 1 |
| 5 | DI Frame sequence number in DI Block(="00h") | 1 |
| 6 | Number of DI bytes in use in this DI Frame | 1 |
| 7 | Reserved = 00h | 1 |
| 8 to 10 | disc type identifier = "BWO" | 3 |
| 11 | disc size / version | 1 |
| 12 | disc structure | 1 |
| 13 | channel bit length | 1 |
| 14 to 15 | DI Frame pointer for velocity | 2 |
| 16 | BCA descriptor | 1 |
| 17 | maximum transfer rate of application | 1 |
| 18 | Write once media type info | 1 |
| 19 to 23 | Reserved = all 00h | 6 |
| 24 to 31 | Data Zone allocation | 8 |
| 32 to 111 | Write strategy parameters | 80 |
| 112 | Disc Information identifier="DI" | 112 |
| 117 | DI Frame sequence number in DI Block(="01h") | |
| 144 to 223 | Write strategy parameters | |
| 224 to 335 | Disc Information Frame (="02h") | 112 |
| | Disc Information Frame (="ih") | 112 |
| 1904 to 2015 | Disc Information Frame (="17h") | 112 |

| Byte position | contents | Number of bytes |
|---|---|---|
| 0 | Disc Information identifier = "DI" | 2 |
| ⋮ | ⋮ | |
| 5 | DI frame sequence number in DI block | 1 |
| ⋮ | ⋮ | |
| 34 to 35 | Recording velocities | 2 |
| ⋮ | ⋮ | |
| 48 to 55 | Write power settings at Nominal Recording velocity | 8 |
| 56 to 63 | Write power settings at Maximum Recording velocity | 8 |
| 64 to 71 | Write power settings at Minimum Recording velocity | 8 |
| ⋮ | ⋮ | |
| 76 to 78 | dTtop first write pulse start time at Nominal Recording velocity | 3 |
| 79 to 81 | dTtop first write pulse start time at Maximum Recording velocity | 3 |
| 82 to 84 | dTtop first write pulse start time at Minimum Recording velocity | 3 |
| ⋮ | ⋮ | |
| 89 to 91 | dTtop first erase pulse start time at Nominal Recording velocity | 3 |
| 92 to 94 | dTtop first erase pulse start time at Maximum Recording velocity | 3 |
| 95 to 97 | dTtop first erase pulse start time at Minimum Recording velocity | 3 |
| ⋮ | ⋮ | |

Disc Information (112 bytes)

00h
01h
02h
03h

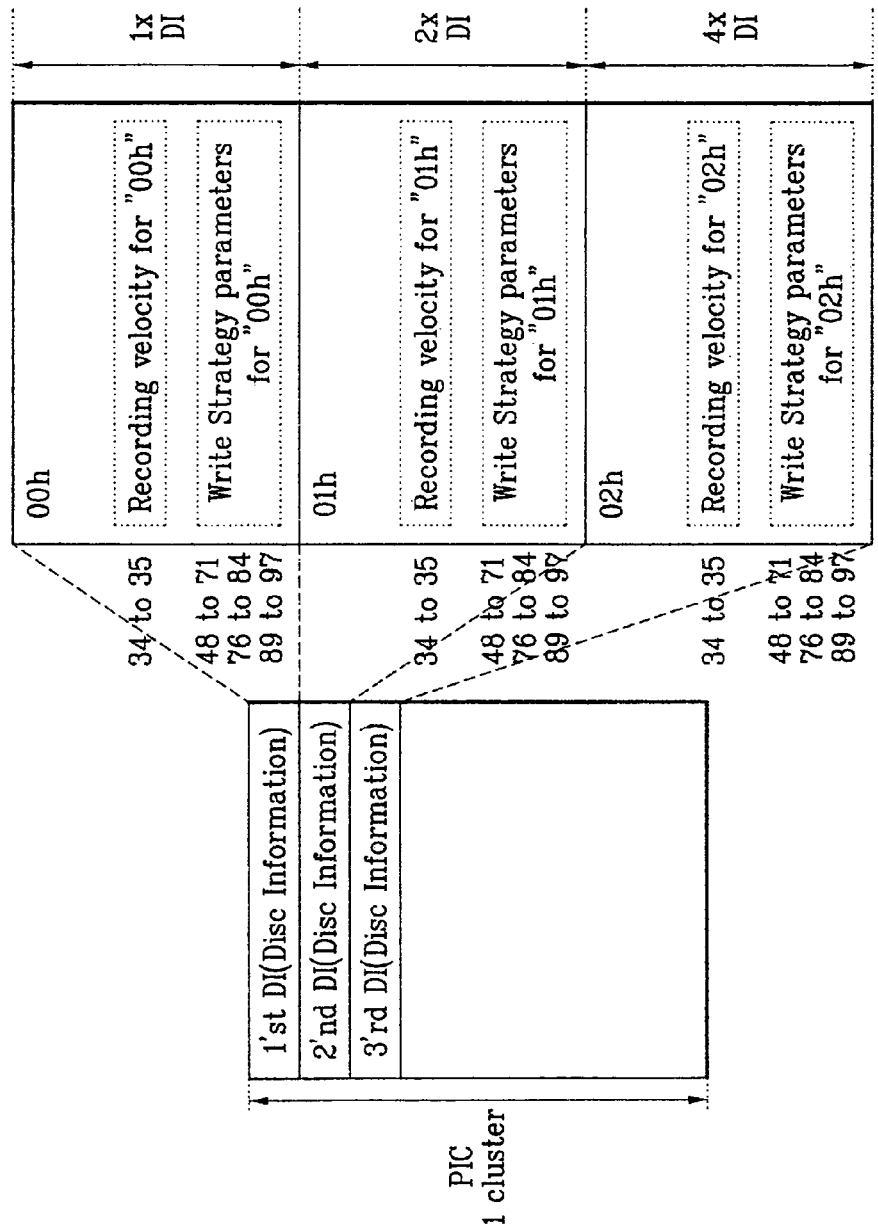

RECORDING MEDIUM, METHOD OF CONFIGURING CONTROL INFORMATION THEREOF, RECORDING AND/OR REPRODUCING METHOD USING THE SAME, AND APPARATUS THEREOF

This application claims the benefit of the Korean Application No. 10-2003-0045826 filed on Jul. 7, 2003 and No. 10-2003-0046147 filed on Jul. 8, 2003, which are hereby incorporated by reference.

BACKGROUND OF THE INVENTION

1. Field of the Invention

The present invention relates to a method of recording control information on a recording medium, such as a recordable optical disc, a method of reproducing control information from a recording medium, such as a read-only optical disc, and a method of recording or reproducing data on or from a recording medium, using the control information.

2. Discussion of the Related Art

A high density optical recording medium, known as HD-DVD, is widely used to record and store high-definition video data and high-quality audio data. The Blu-ray disc (hereinafter abbreviated BD) represents next-generation HD-DVD technology.

The Blu-ray disc (BD) that is a sort of a next generation HD-DVD technology is the next generation optical record solution enabling to store data to remarkably surpass the previous DVD, and the technology specifications of global standardizations for the BD are being established.

Various kinds of specifications or standards associated with the BD have been prepared. Specifically, various standards are prepared for BD-WO (Blu-ray disc write-once) and BD-ROM (Blu-ray disc read only memory) following 1× speed BD-RE (Blu-ray disc rewritable).

The specifications of BD-RE, BD-WO, and BD-ROM provide the same BD based disc formats. Hence, it is needed to uniformly configure control information provided to the discs.

Moreover, as 'version-up' of the specifications keeps being developed to cope with high-speed recording, reciprocal compatibility should be secured in providing the control information as specified information identically applicable to the newly provided future specifications.

SUMMARY OF THE INVENTION

Accordingly, the present invention is directed to a method of configuring control information in an optical disc that substantially obviates one or more problems due to limitations and disadvantages of the related art.

An object of the present invention is to provide a new method of recording control information as specified information, by which control information between the family-series discs is efficiently configured and by which recording/reproducing of an optical disc is efficiently performed from the control information.

Another object of the present invention is to provide a new data structure configuring control information.

Another object of the present invention is to provide a specified method of configuring the defined control information in a specific area within a disc, by which reciprocal compatibility is provided between the family-series discs.

A further object of the present invention is to provide a recording/reproducing method and apparatus thereof, by which real data is efficiently recorded/reproduced on/from an optical disc using control information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of configuring a control information of an optical recording medium according to the present invention includes the step of configuring the control information with a common field for an information applied to both of the read-only and recordable optical recording media and a specific field for an information uniquely applied to at least one optical recording medium, wherein the information in the common field and the specific field having a same byte position as compared to the other optical recording medium.

In another aspect of the present invention, a method of recording or reproducing data on or from a recording medium includes the steps of generating a control information required for recording or reproducing data, the control information including at least one information unit, the information unit including at least recording velocity information and write strategy information, recording the control information on a specific area of the recording medium to have same byte position with respect to at least the recording velocity information as other recordable recording medium type.

In another aspect of the present invention, a recording medium includes a management area includes a recordable area and prerecorded area, and a data area provided to record user data, wherein the recordable area or pre-recorded area include a control information associated with recording or reproducing of data, the control information includes at least one information unit associated with a specific recording velocity or recording layer, the information unit includes at least recording velocity information and write strategy information, wherein at least the recording velocity information is located at a specific location to have same byte position as other recordable recording medium type.

In another aspect of the present invention, an optical recording medium includes at least one recording layer and a control information within a management area of the optical recording medium. And the control information includes a common field for an information commonly applied to the optical recording medium regardless of at least one medium type and a specific field for an information not to be commonly applied to the at least one medium type, wherein the common field and the specific field have a byte position same as that of other medium type.

In another aspect of the present invention, a method of recording or reproducing data on or from an optical recording medium includes the steps of, reading control information provided to a management area of the optical recording medium, the control information including a common field available for read-only and recordable recording medium and a specific field available for only recordable recording medium and, performing a recording or reproducing of data based on an information included in the common field and the specific field.

In another aspect of the present invention, an apparatus for recording or reproducing data on or from an optical recording medium includes an optical pickup reading the control information provided to a management area of the optical recording medium, and a controller controlling a recording of data in a manner confirming a common field available for read-only type and recordable type of the recording medium and a specific field available for only recordable type of the recording medium within each of the control information read from the optical pickup, controlling the recording of data at a specific recording velocity based on a write strategy parameters included within the specific field.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is an exemplary structural diagram of control information of BD-ROM according to one embodiment of the present invention in FIG. 4;

FIG. 6 is an exemplary structural diagram of control information of BD-RE according to one embodiment of the present invention in FIG. 4;

FIG. 7 is an exemplary structural diagram of control information of BD-WO according to one embodiment of the present invention in FIG. 4;

FIGS. 8A to 8C are exemplary structural diagrams of write strategies recorded within control information of recordable discs (BD-RE, BD-WO), respectively.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. For convenience of explanation, a Blu-ray disc (BD) is taken as an example of an optical disc according to the present invention. Yet, it is apparent that the concept of the present invention, which is characterized in an optical disc having its control information recorded thereon, is applicable to DVD-RAM/−RW/+RW/−R/+R and the like of the DVD family series in the same manner, for example.

Besides, although terms used in the present invention are possibly selected from the currently well-known ones, some terms are arbitrarily chosen by the applicant in some cases so that their meanings are explained in detail in the following description. Hence, the present invention should be understood with the intended meanings of the corresponding terms chosen by the applicant instead of the simple names or meanings of the terms themselves.

First of all, 'control information' in the description of the present invention means an area including a various information for disc recording/playback. And, the control information is commonly designated information provided to a prerecorded area within a disc or to an embossed area for a disc user by a disc author. Yet, the control information is provided not only to the prerecorded area but also to a recordable area. The disc information within the prerecorded or embossed area can be copied to the recordable area as well. And, they are just exemplary.

Hence, 'configuring control information' in the present invention means that control information is configured within a disc in a manner of the present invention. And, a meaning of 'recording' is applicable to one case that a disc manufacturer prerecords control information on a disc on manufacturing the corresponding disc and to the other case that a user or system records control information in a recordable area within a disc later.

Specifically, the control information is called 'disc information' in BD or 'physical format information' in DVD-RAM/−RW/+RW/−R/+R. Hence, it is apparent that the technical background of the present invention is identically applicable to 'physical format information' in DVD-RAM/−W/+RW/−R/+R. For convenience of explanation, 'disc information (hereinafter abbreviated DI)' corresponding to a case of Blu-ray disc (BD) is taken as an example.

Figure 1:
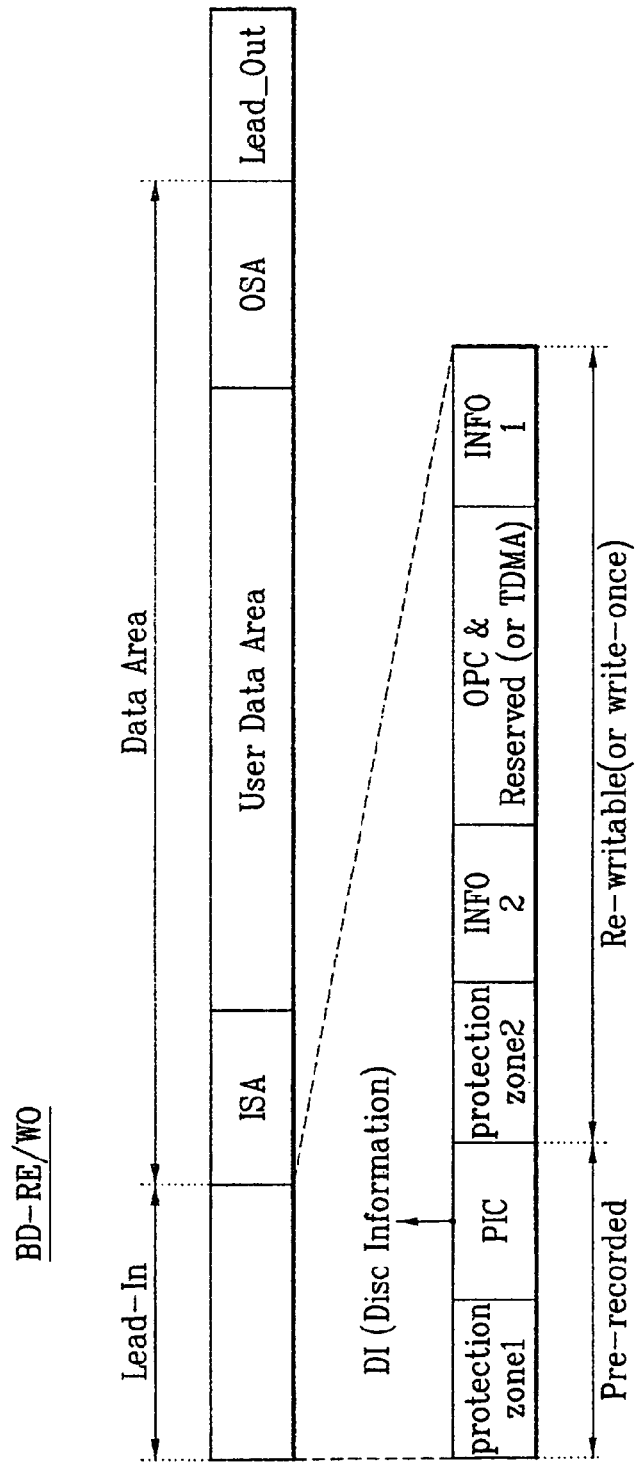
FIG. 1 is a schematic diagram of a recordable disc applicable to the present invention.

FIG. 1 is a structural diagram of a recordable optical disc according to the present invention, in which the recordable optical disc corresponds to a rewritable Blu-ray disc (BD-RE) and a write-once Blu-ray disc (BD-WO).

FIG. 1 shows a single-layer disc having one recording layer according to the present invention.

Referring to FIG. 1, a lead-in area is provided as a management area on an inner circumference area of an optical disc, whereas a lead-out area is provided as a management area on an outer circumference area of the optical disc.

The prerecorded area is an area where data was already written on manufacturing the disc, whereby a user or system is unable to perform data writing on the prerecorded area at all. In BD-RE/WO, the prerecorded area is named PIC (permanent information and control data) area. And, the above-described disc information (hereinafter called 'DI') as information required for disc recording is recorded in the PIC area.

In a data area, provided are a user data area where user's real data is recorded and spare areas ISA and OSA to replace a generated defect area. Specifically, TDMA (temporary defect management area) for recording information of defect and general managements is provided to such a write-once optical disc as BD-WO. In case of the re-writable BD (BD-RE), TDMA is unnecessary so that such an area is left as a reserved area.

Figure 2:
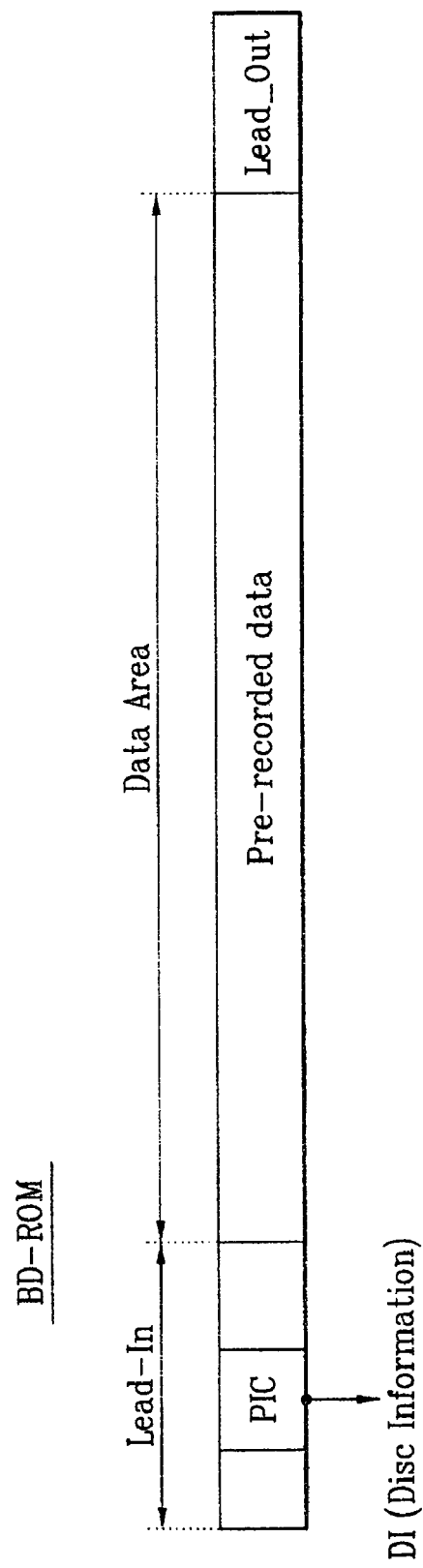
FIG. 2 is a schematic diagram of a read-only disc applicable to the present invention.

FIG. 2 is a structural diagram of a read-only Blu-ray disc (BD-ROM) according to the present invention, in which a single layer having one recording layer is shown.

Referring to FIG. 2, an entire area of a read-only optical disc is prerecorded by pits. And, a recording is made to management and data areas in the same manner. As a PIC area, in which disc information is recorded, includes pits in case of BD-ROM, it can be understood that one cluster consists of 2K*32 bytes like that in the data area. The above-described PIC area of BD-RE/WO in FIG. 1 differs from that of BD-ROM in configuration. Namely, biphase RF modulation is performed on the corresponding PIC area that is different from the data area.

The present invention intends to provide disc information configuration uniformly applicable to the Blu-ray discs of the family series across BD-RE, BD-WO, and BD-ROM, which is explained in detail as follows.

Figure 3:
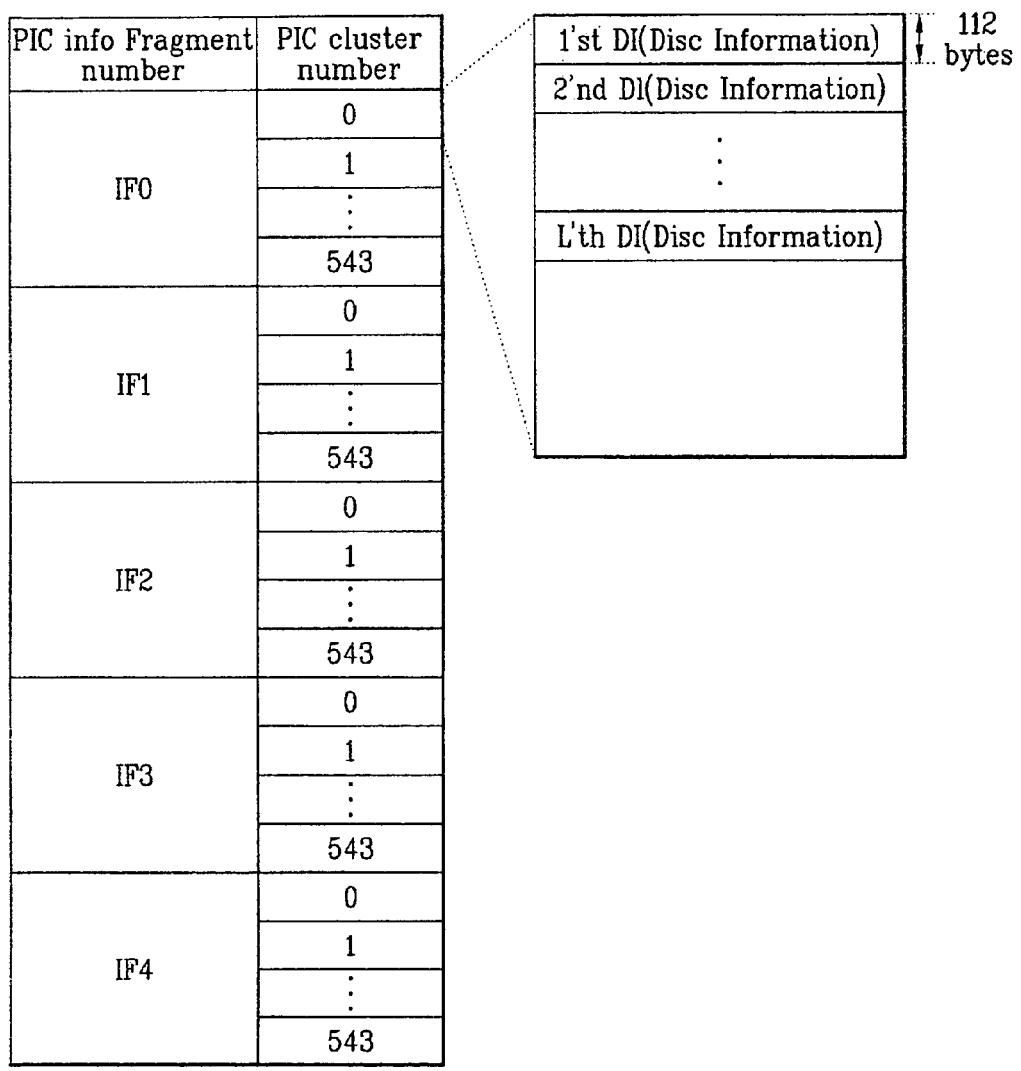
FIG. 3 is a schematic diagram of control information configured within a recordable optical disc according to the present invention.

FIG. 3 is a schematic structural diagram of a PIC area in BD.

Referring to FIG. 3, 'one cluster' in BD represents a minimum recording/reproducing unit, 544 clusters gather to construct one fragment as one higher recording unit, and total five fragments gather to form a PIC area.

Disc information is configured in a front head cluster of a first fragment IF0. The disc information is plurally recorded per recording layer and writing speed applicable by the corresponding optical disc, and one disc information consists of 112 bytes. Specifically, disc information constructed with 112-bytes is called disc information (DI) frame. Moreover, the same contents of the disc information are repeatedly configured in each front head cluster of the rest of the fragments, thereby enabling to cope with loss of the disc information.

Hence, the BD disc information structure, of which formats are currently discussed, is uniformly applicable between BD-RE, BD-WO, and BD-ROM, whereby a system needs no separate hardware per disc type to manage the same disc information. Besides, it can be utilized as a common field of disc information in the same location of the same area regardless of the disc type.

A method of configuring disc information in BD of the family series and an optical disc recording/reproducing apparatus using the same according to the present invention are explained in detail by referring to FIGS. 4 to 9 as follows.

Figure 4:
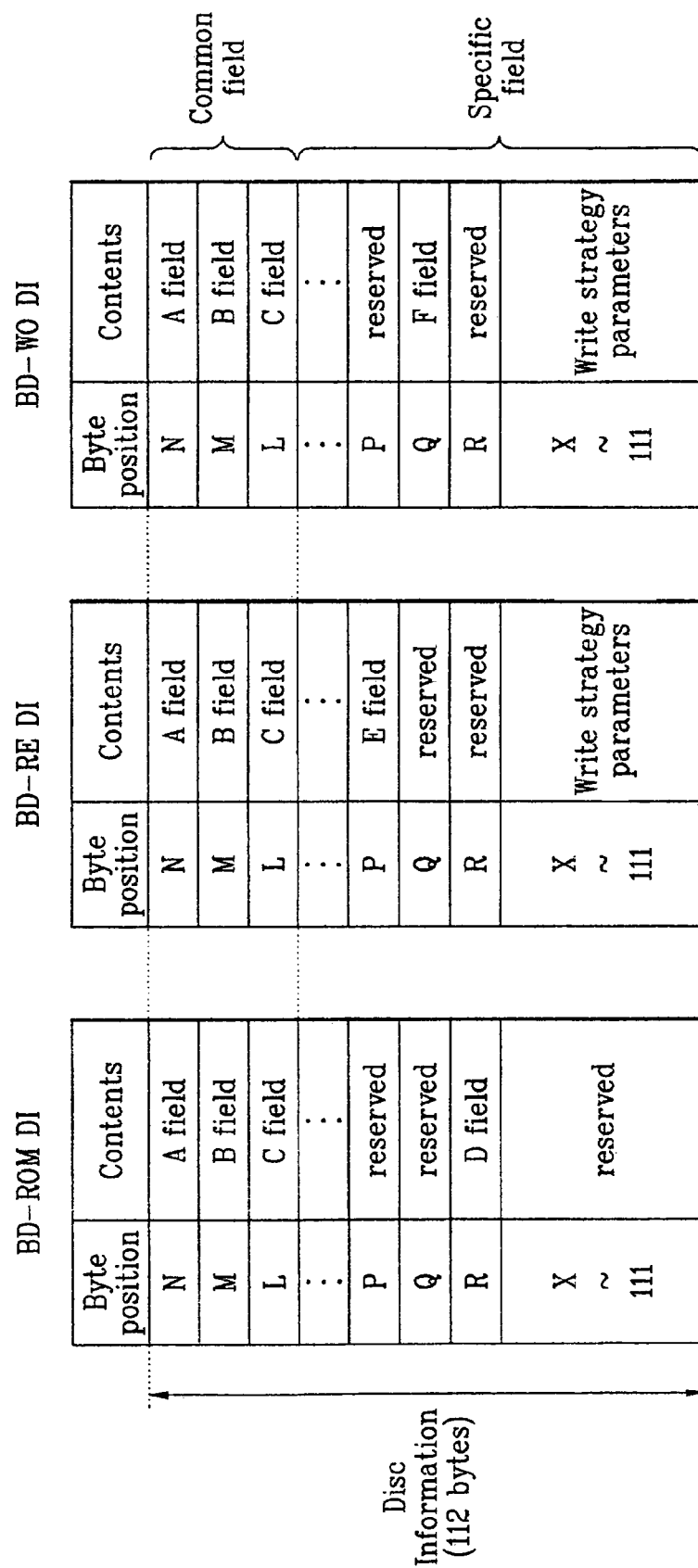
FIG. 4 is an exemplary diagram of control information recorded per disc type in Blu-ray disc according to the present invention.

FIG. 4 shows disc information of BD-ROM, BD-RE, and BD-WO in the family series, in which a minimum unit of each disc information is unified into the same size of 112-bytes. This is to reduce of a load of a system managing the disc information by configuring the disc information with the same size.

Specifically, the disc information is characterized in including a common field recording information commonly applied to a read-only disc and a recordable disc and a specific field recording specific information per disc type.

And, a field within disc information identically applied regardless of the disc type (BD-ROM, BD-RE, BD-WO) is recorded in the same location, which is called 'common field'.

Namely, assuming that A, B, and C fields recorded in $N^{th}$, $M^{th}$, and $L^{th}$ bytes within disc information are the fields identically applied regardless of the disc types, the common field is recorded at the same location of each disc information of BD-ROM, BD-RE, and BD-WO. The common field is generally located at a front head within disc information. Yet, the common field is not necessarily configured at the front head as one unit group collectively but can be scattered within the disc information. Hence, a location corresponding to a specific field can be changed into the common field later. In doing so, unlike the common field located at the front head, the corresponding common field will exist at a different location instead of the front head.

Moreover, a field recorded within disc information, which is not identically applied to each disc type, is recorded using a reserved area to be called 'specific field'. Namely, when a reserved area exists in the same byte position within disc information per disc type, it becomes a specific field.

For instance, 'E filed' is recorded in $P^{th}$ byte of BD-RE in FIG. 4. Yet, $P^{th}$ byte of BD-ROM or BD-WO remains as a reserved area to become a specific field. 'F field' is recorded in $Q^{th}$ byte of BD-WO, whereas $Q^{th}$ byte of BD-ROM or BD-RE remains as a reserved area to become a specific field. 'D field' is recorded in $R^{th}$ byte of BD-ROM, 'D field' of BD-RE or BD-WO remains as a reserved area to become a specific field.

Yet, in case of intending to apply the same field to another disc type, the corresponding field will be configured in the corresponding position byte. For instance, in case that 'E field' is applied to versioned-up BD-WO or BD-ROM, 'E field' is applied to $P^{th}$ byte like BD-RE to be changed into a common field later.

Meanwhile, 'write strategy parameters' field is needed by a recordable disc (BD-RE, BD-WO) only but corresponds to an unnecessary specific field for a read-only disc (BD-ROM). Hence, $X^{th} \sim 111^{th}$ bytes of BD-ROM are handled as a reserved area, whereas 'write strategy parameters' field is written as write strategy information in $X^{th} \sim 111^{th}$ bytes of BD-RE or BD-WO.

Moreover, the 'write strategy parameters' field has no chance to be applied to BD-ROM and will remain as a specific field. Since the 'write strategy parameters' field consists of various kinds of information, e.g., recording velocity, recording power etc., it is needed to configure same content in the same locations (byte positions) within the corresponding field. This will be explained in FIGS. 8A to 8C later.

The location of the field to be recorded within disc information in BD series disc that will be specified is decided according to the above-described concept, whereby compatibility between discs of the family series can be sufficiently met.

FIGS. 5 to 7 show detailed fields of 112-bytes disc information in BD-ROM, BD-RE, and BD-WO using the above concept, respectively.

$0^{th} \sim 13^{th}$, $16^{th}$, $17^{th}$, and $24^{th} \sim 31^{st}$ bytes are configured as a common field and the rest $14^{th}$, $15^{th}$, $18^{th} \sim 23^{rd}$, and $32^{nd} \sim 111^{th}$ bytes are configured as a specific field. And, $32^{nd} \sim 111^{th}$ bytes configure $X^{th} \sim 111^{th}$ bytes recording 'write strategy parameters' therein. Yet, such a byte configuration is just exemplary to efficiently describe the present invention. And, it is apparent that byte positions corresponding to common and specific fields can differ.

FIG. 5 is an exemplary structural diagram of control information of BD-ROM.

Referring to FIG. 5, a disc information size of 112-bytes is maintained. $32^{nd} \sim 111^{th}$ bytes recording 'write strategy parameters' therein configure a specific field to be handled as a reserved area. As total 2048 bytes construct one sector, it is able to record up to eighteen disc information within one sector.

And, $0^{th} \sim 13^{th}$, $16^{th}$, $17^{th}$, and $24^{th} \sim 31^{st}$ bytes construct a common field which is the same as configured in disc information of BD-RE or BD-WO.

BD-ROM that is a read-only disc has no relation to a writing speed, thereby needing no 'write strategy parameters'. Hence, it is enough for BD-ROM to include one disc information per recording layer. In such a case, two disc information are configured in a dual-layer BD-ROM and the rest bytes are possibly set to 'zero'.

FIG. 6 is an exemplary structural diagram of control information of BD-RE.

Referring to FIG. 6, a disc information size of 112-bytes is maintained. $32^{nd} \sim 111^{th}$ bytes recording 'write strategy parameters' therein configure a specific field represented by a corresponding disc information. The 'write strategy parameters' in byte position $32^{nd}$ to $111^{th}$ may include a recording velocity information, write power and so on. As total 2048 bytes construct one sector, it is able to record up to 18 disc information within one sector.

And, $0^{th}$~$13^{th}$, $16^{th}$, $17^{th}$, and $24^{th}$~$31^{st}$ bytes construct a common field which is the same as configured in disc information of BD-ROM or BD-WO. In case of intending to add a field specific to BD-RE, a specific field within disc information is utilized in recording.

For instance, in case of intending to newly add 'DI frame pointer for velocity' field, it is able to record the corresponding field in $14^{th}$~$15^{th}$ bytes using a reserved area as a previous specific field. In disc information of BD-ROM, the corresponding $14^{th}$~$15^{th}$ bytes are maintained as a reserved area.

FIG. 7 is an exemplary structural diagram of control information of BD-WO.

Referring to FIG. 7, a disc information size of 112-bytes is maintained. 'Write strategy parameters' are recorded in $32^{nd}$~$111^{th}$ bytes indicating a specific field represented by a corresponding disc information. As total 2048 bytes construct one sector, it is able to record up to 18 disc information within one sector.

And, $0^{th}$~$13^{th}$, $16^{th}$, $17^{th}$, and $24^{th}$~$31^{st}$ bytes construct a common field which is the same as configured in disc information of BD-ROM or BD-RE. In case of intending to add a field specific to BD-WO, a specific field within disc information is utilized in recording.

For instance, in case of intending to newly add 'Write-Once media type info' field, it is able to record the corresponding field in $18^{th}$ byte using a reserved area as a previous specific field. The 'write-once media type info' may identify media type whether the media comprises organic dye or inorganic dye and so on. In disc information of BD-ROM or BD-RE, the corresponding $18^{th}$ byte is maintained as a reserved area.

And, in case of intending to newly add 'DI frame pointer for velocity' field to disc information of BD-WO, the corresponding field is written in $14^{th}$~$15^{th}$ bytes like BD-RE to maintain compatibility between discs.

By allocating the fields expected to be added thereto in a manner of considering whether the corresponding field is a common field commonly applied thereto or a specific field applied to a specific disc type, consistent field addition is enabled as well as compatible management conducted by a system.

Figure 8C:
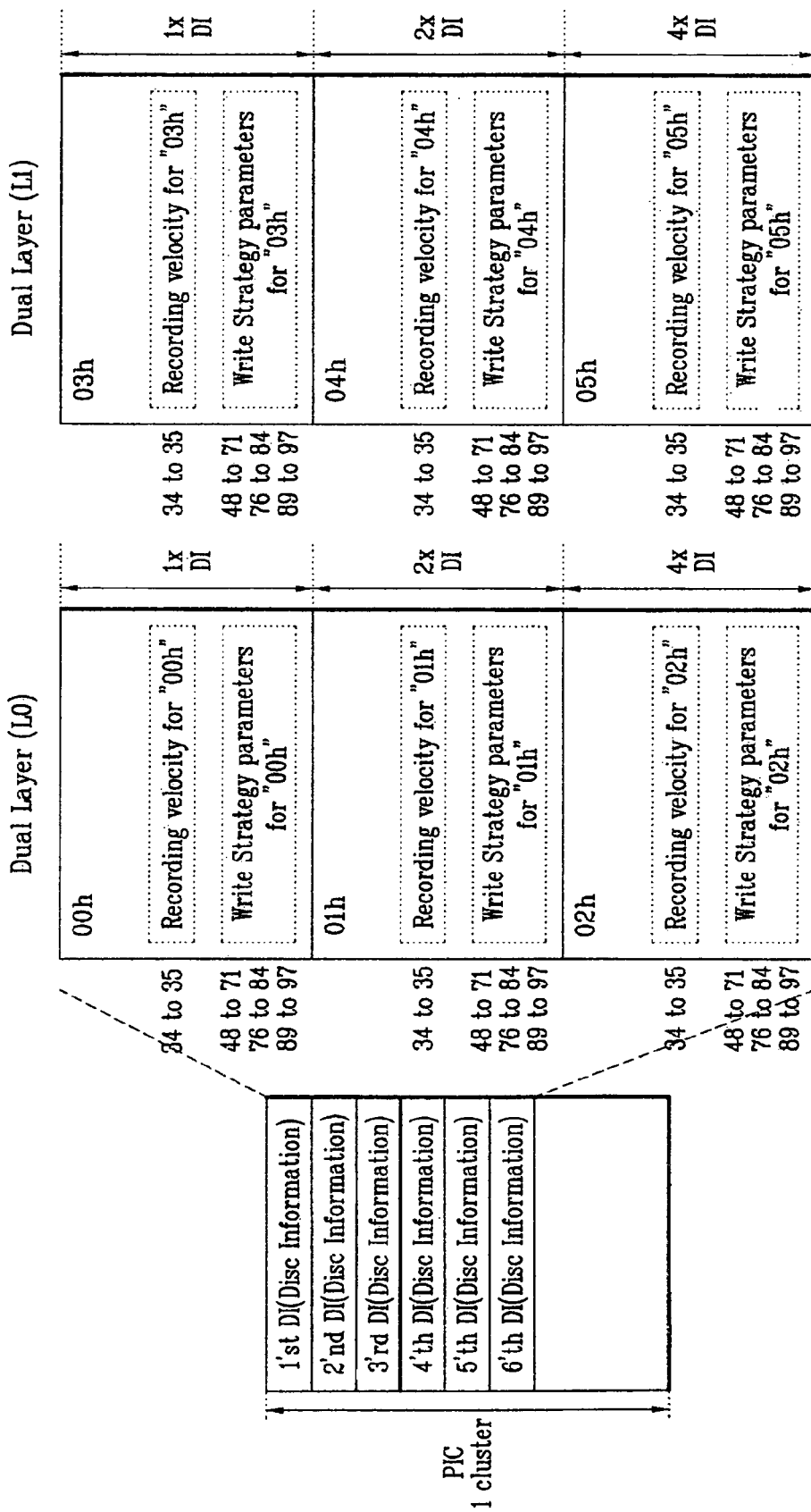

FIGS. 8A to 8C are structural diagrams of recording velocity information and write strategy parameters recorded within control information of recordable discs (BD-RE, BD-WO), respectively. As mentioned in the foregoing description, since the field recording the information therein corresponds to a reserved area to be set to 'zero', the corresponding field keeps remaining as a specific field.

In case of a recordable disc such as BD-RE and BD-WO, 'recording velocity information' field includes nominal recording velocity, maximum recording velocity, and minimum recording velocity of the recordable disc, and 'write strategy parameters' field associated with the recording velocities includes an important information, such as recording power, recording pulse timing etc., to perform a recording of data. The data written in the corresponding area includes various types, the foregoing explained concept of the common and specific fields needs to be applied to the information configured to be recorded in the corresponding field.

FIG. 8A shows one embodiment of disc information of an optical disc recorded according to the present invention.

Referring to FIG. 8A, a sequence for each disc information is decided by a sequence number and is recorded by 1-byte. For instance, the corresponding information is recorded in $5^{th}$ byte within disc information, is named 'DI frame sequence number in DI block', and is briefly represented by '00h, 01h, 02h, ...'. Namely, if the information of the $5^{th}$ byte is '00h', it means $1^{st}$ disc information. If the information of the $5^{th}$ byte is '07h', it means $8^{th}$ disc information.

Recording velocity information including nominal, maximum and minimum recording velocity, indicated by a corresponding disc information, and write strategy parameters associated with a corresponding recording velocity are recorded in a -complied specific location within a specific area of disc information.

For instance, recording velocity information of disc information is recorded in $34^{th}$ and $35^{th}$ bytes within the corresponding disc information. Write power information, which is associated with a corresponding velocity, of maximum and minimum velocities is recorded in $56^{th}$~$71^{st}$ bytes. Start time points of write pulses of maximum and minimum velocities are recorded in $79^{th}$~$84^{th}$ bytes to be associated with the corresponding velocity. And, start time points of erase pulses of maximum and minimum velocities are recorded in $92^{nd}$~$97^{th}$ bytes to correspond to the corresponding velocity.

And, $48^{th}$~$55^{th}$, $76^{th}$~$78^{th}$, and $89^{th}$~$91^{st}$ bytes relate to write power at nominal velocities. A nominal velocity generally means 1× speed, and the corresponding information is preferably set to the same value to be recorded in the entire disc information regardless of their corresponding velocities.

As the velocity information and write strategy information are recorded in the same area within disc information in case of an optical disc of the same kind such as BD-RE and BD-WO, a microcomputer ('16' in FIG. 9) reproduces specific velocity information and write strategy parameters coping with a corresponding velocity via the same area within the disc information, thereby enabling efficient recording/reproducing.

FIG. 8B schematically shows an example of configuring disc information in a manner of FIG. 8A.

Referring to FIG. 8B, in case that three different recording velocity information are needed by a single layer having one recording layer, three disc information are required for the three different recording velocity information, respectively. A sequence number, recording velocity information corresponding to the sequence number, and write strategy information are allocated to the same area to be recorded.

For instance, if the recording velocities to be represented are 1× speed, 2× speed, and 4× speed in $1^{st}$ disc information, a sequence number corresponds to '00h' and the corresponding velocity and write strategy are recorded in a complied location of $32^{nd}$~$97^{th}$ bytes, respectively. In $2^{nd}$ disc information, a sequence number corresponds to '01h' and the corresponding velocity and write strategy are recorded in a complied location of $32^{nd}$~$97^{th}$ bytes like the $1^{st}$ disc information, respectively. In $3^{rd}$ disc information, a sequence number corresponds to '02h' and the corresponding velocity and write strategy are recorded in a complied location of $32^{nd}$~$97^{th}$ bytes like the $1^{st}$ or $2^{nd}$ disc information, respectively.

FIG. 8C schematically shows another example of configuring disc information in a manner of FIG. 8A.

Referring to FIG. 8C, in case that three different recording velocity information are needed by each of the two recording layers of a dual layer, total six disc information are required for the three different recording velocity information of each of the two recording layers. A sequence number, recording velocity information corresponding to the sequence number, and write strategy information are allocated to the same area to be recorded.

For instance, if the recording velocities to be represented are 1× speed, 2× speed, and 4× speed, $1^{st}$ to $3^{rd}$ disc information means disc information for $1^{st}$ recording layer. In the $1^{st}$ disc information, a sequence number corresponds to '00h' and the corresponding velocity and write strategy are recorded in a complied location of $32^{nd}$~$97^{th}$ bytes, respectively. In the $2^{nd}$ disc information, a sequence number corresponds to '01h' and the corresponding velocity and write strategy are recorded in a complied location of $32^{nd}$~$97^{th}$ bytes like the $1^{st}$ disc information, respectively. In the $3^{rd}$ disc information, a sequence number corresponds to '02h' and the corresponding velocity and write strategy are recorded in a complied location of $32^{nd}$~$97^{th}$ bytes like the $1^{st}$ or $2^{nd}$ disc information, respectively.

Meanwhile, $4^{th}$ to $6^{th}$ disc information means disc information for $2^{nd}$ recording layer. In the $4^{th}$ to $6^{th}$ disc information, sequence numbers correspond to '03h' to '05h', respectively. And, the corresponding velocities and write strategies are recorded in complied locations of $32^{nd}$~$97^{th}$ bytes like the disc information of the $1^{st}$ recording layer, respectively.

Otherwise, the order of 6 disc information may be configured differently (not shown), as compared to the FIG. 8C. That is, the order can be configured first according to recording velocities, and second according to recording layers within the same recording velocities. In that case, the $1^{st}$ disc information relates to 1× speed and $1^{st}$ recording layer which has a sequence number "00h", and the $2^{nd}$ disc information relates to 1× speed and $2^{nd}$ recording layer which has a sequence number "01h" and so on.

Figure 9:
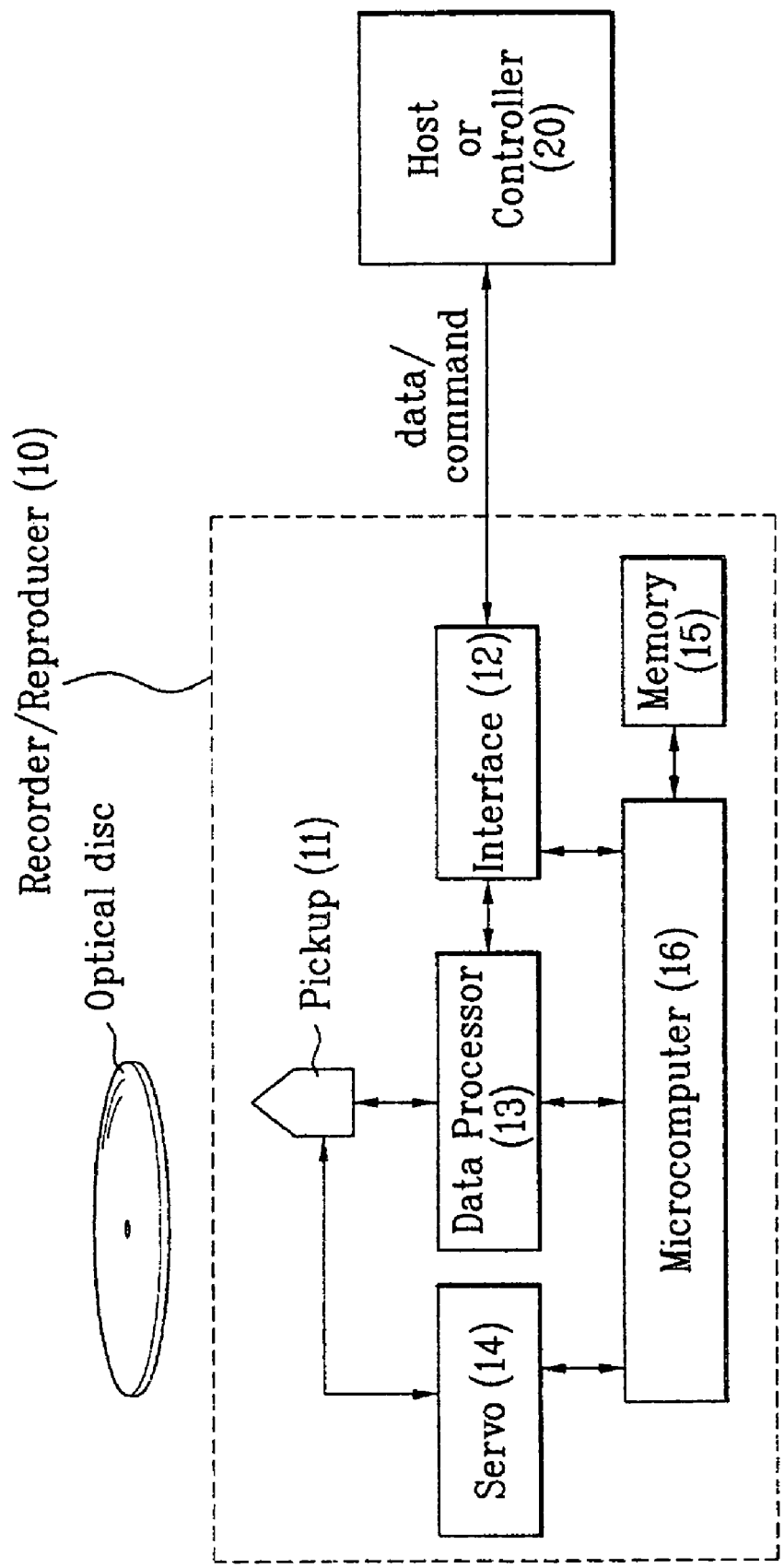
FIG. 9 is a block diagram of an optical disc recording/reproducing apparatus using control information according to the present invention.

FIG. 9 is a block diagram of an optical disc recording/reproducing apparatus using disc information according to the present invention.

Referring to FIG. 9, a recording/reproducing apparatus according to the present invention includes a recorder/reproducer 10 carrying out recording/reproducing on an optical disc and a control unit 20 controlling the recorder/reproducer 10.

The control unit 20, e.g., a host, gives a recording or reproducing command for a specific area, and the recorder/reproducer 10 caries out the recording/reproducing on the specific area according to the command of the control unit 20. Specifically, the recorder/reproducer 10 includes an interface unit 12 performing communications with an external device, e.g., the control unit 20 (host), a pickup unit 11 directly recording data on the optical disc or reproducing the data, a data processor 13 receiving a reproducing signal from the pickup unit 11 to restore into a necessary signal value or modulating to deliver a signal to be recorded into a signal to be recorded on the optical disc, a servo unit 14 reading out a signal from the optical disc correctly or controlling the pickup unit 11 to record a signal on the optical disc correctly, a memory 15 temporarily storing various information including a management information and data, and a microcomputer 16 responsible for controlling the above-described elements within the recorder/reproducer 10.

Meanwhile, the microcomputer 16 may have the function of the control unit 20 in a device without communication with an external device.

A recording or reproducing process of an optical disc according to the present invention is explained in detail as follows.

First of all, once an optical disc is loaded in the recording/reproducing apparatus, the entire disc management information within the disc is read out to be temporarily stored in the memory 15 of the recorder/reproducer 10. And, various kinds of the disc management information are utilized for the recording/reproducing on/from the optical disc.

Specifically, the recording/reproducing apparatus enables to confirm the disc information by 112-bytes, whereby the disc information can be always reproduced even if a disc type is incorrectly detected. As the common fields are recorded in the common locations within the disc information, it is facilitated to reproduce the disc information. Hence, it is able to efficiently cope with the recording/reproducing using the disc information.

By the recording or reproducing command of the control unit 20, the disc information can be easily acquired at any time to enable to utilize various information recorded within the disc information. Therefore, the present invention enables to smoothly perform the recording or reproducing command.

Accordingly, the present invention provides a method of utilizing the common and specific fields in configuring control information of a high-density optical disc of the family series, thereby enabling to facilitate to configure control information for each of the disc types of the family series expected to be standardized and to efficiently cope with the recording/reproducing of the optical discs.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of configuring a control information of an optical recording medium, comprising the step of:
    configuring the control information with a common field and a specific field, the common field for information applied to at least two types of optical recording medium, and the specific field for information uniquely applied to at least one specific type of optical recording medium, wherein the information in the common field and the information in the specific field are located in predetermined byte positions, respectively.

2. The method of claim 1, wherein the specific field of the corresponding optical recording medium is set as a reserved area when not to record the corresponding information therein.

3. The method of claim 1, wherein a write strategy parameters field is configured in the specific field of the recordable optical recording medium.

4. The method of claim 3, wherein the write strategy parameters field of the read-only optical recording medium is set to zero.

5. The method of claim 1, wherein the common field is configured in a front head of the control information.

6. The method of claim 1, wherein the common field is configured between a front head of the control information and the specific field.

7. The method of claim 6, wherein the common field is configured between the front head of the control information and the specific field is changed from an initial specific field.

8. An optical recording medium, comprising:
    at least one recording layer; and
    a management area of the optical recording medium storing control information, the control information including a common field and a specific field, the common field for information commonly applied to at least two types of the optical recording medium and the specific field for information not to be commonly applied to the at least one optical recording medium type,
        wherein the information in the common field and the information in the specific field are located in predetermined byte positions respectively.

9. The optical recording medium of claim 8, wherein the optical recording medium is a Blu-ray disc.

10. The optical recording medium of claim 9, wherein the optical recording medium is a read-only Blu-ray disc, and the other optical recording medium is a recordable Blu-ray disc.

11. The optical recording medium of claim 9, wherein the optical recording medium is a rewritable Blu-ray disc, the other optical recording medium is read-only Blu-ray disc or write-once Blu-ray disc.

12. The optical recording medium of claim 9, wherein the optical recording medium is a write-once Blu-ray disc, the other optical recording medium is read-only Blu-ray disc or rewritable Blu-ray disc.

13. A method of recording or reproducing data on or from an optical recording medium, comprising the steps of:
 reading control information provided to a management area of the optical recording medium, the control information including a common field available at least two types of optical recording medium and a specific field available for at least one specific type of optical recording medium; and
 performing a recording or reproducing of data based on the information included in at least one of the common field and the specific field.

14. The method of claim 13, wherein the performing step comprises:
 confirming the write strategy parameters included within the specific field if the optical recording medium is recordable type, and
 performing a recording of data using the write strategy parameters.

15. The method of claim 13, wherein the performing step comprises:
 confirming the information included within the common field if the optical recording medium is read-only type, and
 performing a reproducing of data using the common field only.

* * * * *